United States Patent
Fury

(10) Patent No.: US 6,394,206 B1
(45) Date of Patent: May 28, 2002

(54) VEHICLE GENERATOR CONTROL

(76) Inventor: Robert Fury, 81 Pickerel Rd., Monroe, NY (US) 10950

( * ) Notice: Subject to any disclaimer, the term of this patent is extended or adjusted under 35 U.S.C. 154(b) by 0 days.

(21) Appl. No.: 09/688,363

(22) Filed: Oct. 12, 2000

(51) Int. Cl.$^7$ .............................................. B60K 17/28
(52) U.S. Cl. .................... 180/53.4; 180/53.8; 180/65.3; 74/15.86
(58) Field of Search ................................ 180/53.4, 53.5, 180/53.8, 65.4, 65.3; 74/732.1, 733.1, 15.86; 60/420

(56) References Cited

U.S. PATENT DOCUMENTS

| | | | |
|---|---|---|---|
| 2,606,624 A | * 8/1952 | Chiotte | ...................... 180/53.8 |
| 3,631,256 A | * 12/1971 | Reynolds | |
| 3,941,016 A | 3/1976 | Will | |
| 4,206,608 A | * 6/1980 | Bell | |
| 4,287,429 A | 9/1981 | Bashnin et al. | |
| 4,413,698 A | * 11/1983 | Conrad et al. | ............. 180/65.3 |
| 5,028,221 A | 7/1991 | Malfit | |
| 5,200,674 A | * 4/1993 | Fujimoto et al. | |
| 5,410,943 A | 5/1995 | Kervagoret | |
| 5,421,705 A | 6/1995 | Benckert | |
| 6,023,134 A | * 2/2000 | Carl et al. | ................. 60/420 X |
| 6,269,713 B1 | * 8/2001 | Ohke | ......................... 74/733.1 |

\* cited by examiner

Primary Examiner—Brian L. Johnson
Assistant Examiner—Bryan Fischmann
(74) Attorney, Agent, or Firm—Siemens Patent Services LC

(57) ABSTRACT

Control apparatus for maintaining constant speed of an AC generator carried aboard a motor vehicle having an engine, a transmission including a power take-off, and an AC generator. The control apparatus includes a hydraulic pump driven from the power take-off, a hydraulic motor drivably connected to the generator, a fluid circuit driving the hydraulic motor from the hydraulic pump, a closed center proportional servo control valve assembly controlling the fluid circuit, and a control circuit disposed to control the proportional control valve assembly. The control circuit includes an eddy current detecting speed sensor disposed to sense rotational speed of the hydraulic motor, or alternatively, includes an AC generator frequency reference signal generator, a comparing subcircuit which compares sensed speed of the hydraulic motor to a reference signal provided by a digital variable pulse generator, manual controls, an automatic ramp generator which controls acceleration of the generator such that acceleration proceeds gradually from a stopped condition to full operating speed, an annunciating display, and a main circuit breaker. The control valve assembly throttles both pressurized fluid entering the valve assembly from the pump and also spent fluid being returned to the pump through the valve assembly, thereby equalizing pressure drop on each side of the valve assembly. The hydraulic system includes a fluid storage tank, an oil filter, and an oil cooler.

18 Claims, 4 Drawing Sheets

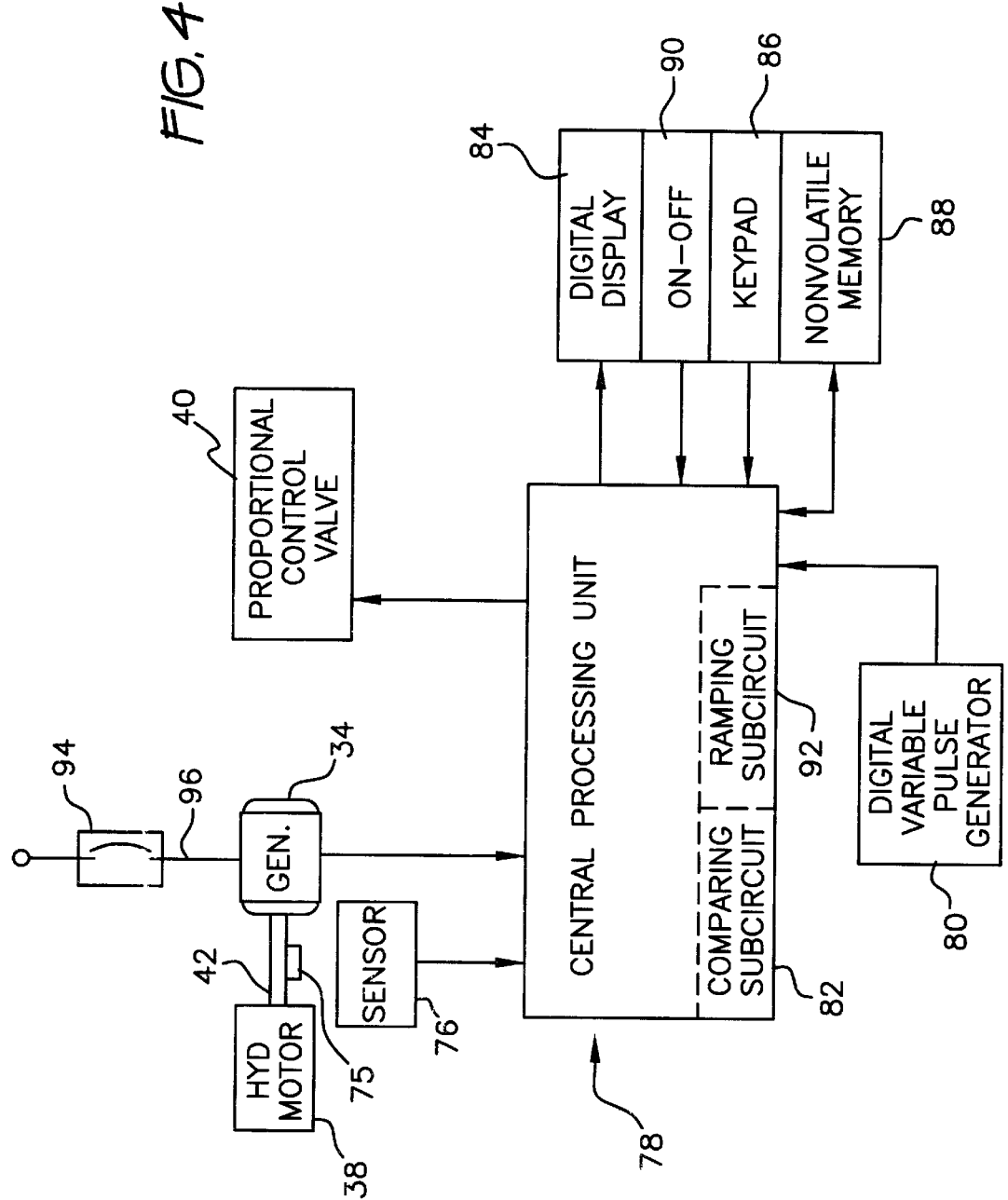

VEHICLE GENERATOR CONTROL

BACKGROUND OF THE INVENTION

1. Field of the Invention

The present invention relates to control of vehicle mounted, engine driven generators for the purpose of stabilizing frequency and voltage characteristics of generator output. The invention finds applications in vehicles equipped with electrically operated auxiliary apparatus dependent upon stable alternating current (AC) electrical power, wherein ground vehicles, boats, and aircraft are provided with generators driven by the prime power-plant of the vehicle. Examples of vehicles which could benefit from incorporating the invention include rescue and military vehicles having AC powered communications equipment, utility and telephone company repair and maintenance vehicles, vehicles providing electrical welding equipment, and other vehicles utilizing AC equipment powered directly from an engine driven AC generator.

2. Description of the Prior Art

Many vehicles carry aboard equipment which is electrically operated by alternating current. Ordinary vehicular generators-are typically designed to convert AC output to DC for the purpose of charging the battery, and for supplying originally installed vehicular electrical equipment which is DC operated for compatibility with a battery based vehicle electrical system. As functions of vehicles have been increased over the years, it has become possible to drive an auxiliary generator from the engine or principal power plant of the vehicle. Typically this is accomplished by connecting the generator to a power take off or to any other suitable point of connection to engine output. While this will indeed operate a generator, variations in engine speed will wreak havoc with characteristics of power output and therefore with equipment which is dependent upon stable voltage and frequency characteristics of electrical power.

U.S. Pat. No. 4,287,429, issued to Oleg I. Bashnin et al. on Sep. 1, 1981, sets forth a control circuit for controlling the output of a hydraulically driven generator. The hydraulic circuit of Bashnin is appropriate for a large scale hydroelectric generator, but lacks structure appropriate for a motor vehicle mounted generator, as seen in the present invention. Notably, a small hydraulic motor, oil filter, oil tank, oil cooler, and small hydraulic controls are not shown in Bashnin.

U.S. Pat. No. 5,028,221, issued to Jean Malfit on Jul. 2, 1991, sets forth an improved generator receiver which is a mechanical component disposed in the power train of a generator. This mechanical component lacks a control scheme including a comparison circuit and a master spool valve for assuring that the driven element rotate at constant speed, as seen in the present invention.

U.S. Pat. No. 5,421,705, issued to Hartmut, Benckert on Jun. 6, 1995, describes a safety limit control for a concrete pump. The control limits the amount of concrete being pumped to avoid stalling of a diesel power plant. The system of Benckert does not vary hydraulic output of a pump such that the output to an associated hydraulic motor is constant despite fluctuating input speeds from the motor. The control scheme of Benckert lacks the comparison circuit and hydraulic circuit of the present invention.

U.S. Pat. No. 3,941,016, issued to Gerhard Will on Mar. 2, 1976, describes a hydraulic pressure generator which produces pressure responsive to engine speed. Logic of operation is opposite that of the present invention. Will provides a variable output for the purpose of assisting in determining when to cause an automatic transmission to change gears. The present invention provides a constant output regardless of input speed from the engine so that the element driven by the engine rotates at a constant speed.

U.S. Pat. No. 5,410,943, issued to Gilbert Kervagoret on May 2, 1995, sets forth a progressively opening control valve for a motor vehicle anti-skid braking system. This valve lacks the control system as seen in the present invention, which control system includes a comparison circuit utilizing a rotational speed sensor and a reference source. The valve of Kervagoret is a single component of a hydraulic circuit, rather than comprising a complete circuit as seen in the present invention.

The need for controlling speed of an AC generator mounted in a motor vehicle, wherein the principal engine of the vehicle also drives the generator, has not been answered in the prior art. None of the above inventions and patents, taken either singly or in combination, is seen to describe the instant invention as claimed.

SUMMARY OF THE INVENTION

The present invention provides a control scheme for assuring that a generator carried aboard a motor vehicle and driven by the principal power plant of the motor vehicle be driven at constant speeds. This is an important condition for assuring proper operation of AC operated equipment carried aboard the vehicle. In vehicles wherein an AC generator is powered by the engine of the vehicle, variations in engine speed threaten to disrupt operation of equipment dependent upon stable voltage and frequency characteristics of the electrical power. Since engine speeds vary with demand for power to propel the vehicle, the novel control scheme provides a hydraulic system which operates the generator at constant speeds despite variations in engine speeds.

This is accomplished by providing a hydraulic pump coupled to the output of the engine of the vehicle, and driving a hydraulic motor therefrom. The generator is driven by the hydraulic motor. A control valve assembly is interposed between the hydraulic pump and the hydraulic motor to apportion pressurized hydraulic fluid from the pump such that the hydraulic motor receives a constant flow rate. A control circuit senses operating conditions and controls the control valve assembly appropriately to maintain the constant flow rate.

Auxiliary functions of the system include providing gradual acceleration of the generator when starting from the stopped condition, adjustment of generator output characteristics, and cooling of hydraulic fluid. Gradual acceleration or "soft start" mitigates or eliminates damage which might otherwise result from abrupt connection to engine power. The period of acceleration from the stopped condition to full speed is adjustable within a range of ten seconds to one minute, and may be controlled by a human operator of the system. Combined with protection from fluid overheating, the motor, seals, fluid conduits, and control valves are protected from damage associated with viscous fluid.

A particularly advantageous feature of the invention is that the control valve assembly meters fluid flow in both inlet and outlet directions, thereby maintaining pressure drop on both sides of the control valve assembly almost equal. This increases efficiency by reducing heat and power losses, and assists in virtually eliminating overspeed and underspeed of the generator as conditions change.

The apparatus is self-contained and readily retrofit to a motor vehicle having a power take-off. The apparatus includes a circuit breaker so that, combined with ability to manage generator speed and to limit fluid temperatures, the apparatus is self-protecting. A display annunciates output voltage, output frequency, output amperage, generator rotational speed, and elapsed time of operation.

Accordingly, it is one object of the invention to provide control of a generator driven by the engine of a motor vehicle such that generator speed and hence electrical output remain constant despite fluctuations in engine speed.

It is another object of the invention that the control system virtually eliminate overspeed and underspeed as the system adjusts fluid input to the hydraulic motor driving the generator responsive to fluctuations in speed of the engine of he motor vehicle.

It is a further object of the invention that the apparatus be self-protecting from damage to overpressure and overtemperature of pressurized hydraulic fluid.

Still another object of the invention is to provide annunciation of generator output characteristics.

An additional object of the invention is that the apparatus be self-contained and readily retrofit to motor vehicles having power take-offs.

It is still a further object of the invention that acceleration of the generator from the stopped condition be gradual.

Yet another object of the invention is to provide selectively variable time of acceleration of the generator from the stopped condition to full operating speeds, and to enable a human operator to select the rate of acceleration.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 4 is a schematic diagram of electrically and electronically operated components of the motor vehicle of FIG. 1.

DETAILED DESCRIPTION OF THE PREFERRED EMBODIMENTS

Figure 1:
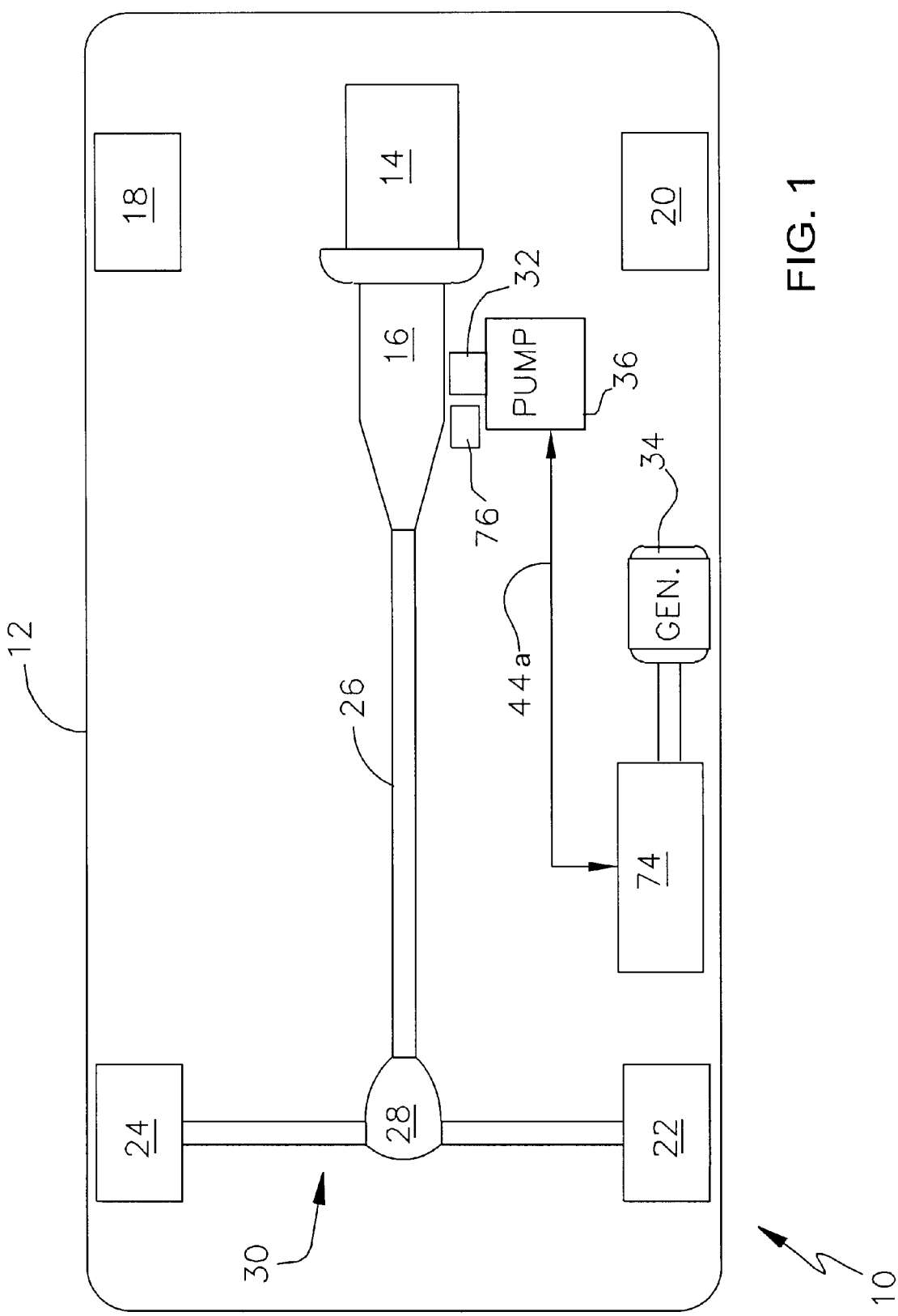
FIG. 1 is a diagrammatic, top plan view of a motor vehicle embodying the present invention.

FIG. 1 of the drawing shows a motor vehicle 10 having a chassis 12, an engine 14, a transmission 16, and wheels 18, 20, 22, 24 suspended from chassis 12. Engine 14 provides torque to transmission 16, which in turn drives wheels 22, 24 through a suitable drivetrain including a driveshaft 26, differential assembly 28, and a rear axle 30. The aforementioned components of vehicle 10 are conventional and need not be described further herein apart from noting that chassis 12 is intended in a representative sense. That is, objects described as being supported on chassis 12 may be indirectly supported. For example, an object may be fixed to the body (not separately shown) or to any other structurally sturdy component of vehicle 10 which is ultimately fixed to chassis 12. Transmission 16 has a power take-off 32 for driving diverse rotatable equipment (not shown).

Motor vehicle 10 is improved according to the present invention by providing an alternating current (AC) generator 34 carried aboard vehicle 10. Generator 34 is driven at a constant speed despite fluctuations in speed of engine 14 by an automatically controlled hydraulic system. The constant speed may be any selected speed, but will usually be that assuring that frequency of generator output be 60 Hz, so that sensitive equipment (not shown) carried on vehicle 10 will operate properly. Illustratively, for a two pole, single phase generator, a preferred constant speed is 3,600 revolutions per minute (RPM).

Figure 2:
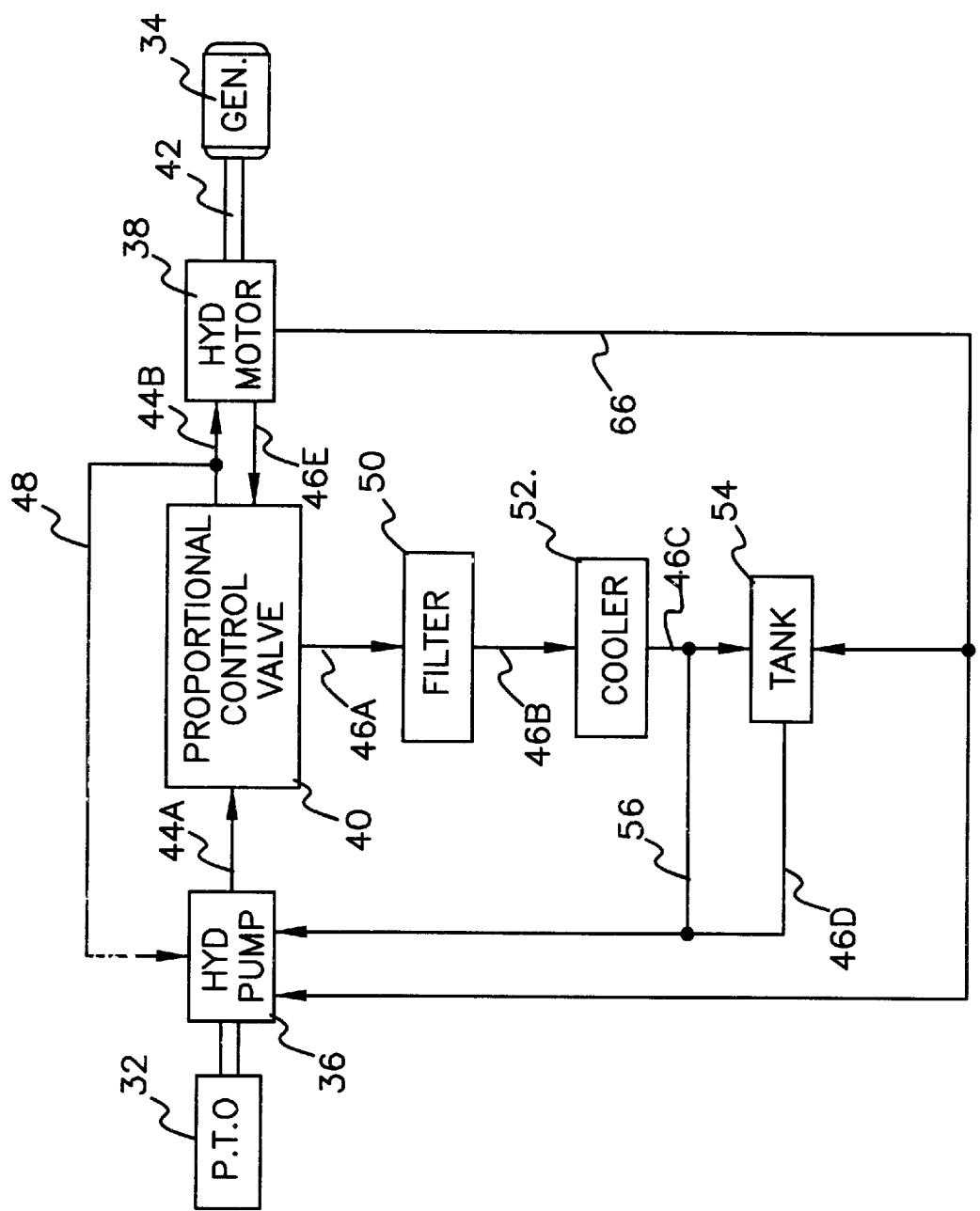
FIG. 2 is a schematic diagram of the hydraulic circuit of the embodiment of FIG. 1.

Principal hydraulic components of the embodiment of FIG. 1 include a hydraulic pump 36 connected to and driven by power take-off 32, a hydraulic motor 38 (see FIG. 2), and a proportional control valve assembly 40 (see FIG. 2). Turning to FIG. 2, pump 36 is a conventional pump having an inlet (not separately shown) disposed to receive fluid for pumping and an outlet (not separately shown) for discharging pumped fluid under pressure. Hydraulic motor 38 is drivably connectable to generator 34 by a shaft 42. Motor 38 may be a conventional hydraulic motor having an inlet (not separately shown) disposed to receive fluid under pressure and an outlet (not separately shown) disposed to discharge spent fluid for recirculation to pump 36.

The fluid circuit depicted in FIG. 2 includes a supply conduit (shown to comprise two sections 44A, 44B) disposed to conduct pressurized fluid discharged by pump 36 to motor 38, and two recirculating conduits disposed to return fluid discharged by motor 38 to pump 36. The first recirculating conduit 48 is disposed to return fluid discharged by pump 36 directly back to the inlet of pump 36, bypassing motor 38. The second return conduit includes sections 46A, 46B, 46C, 46D, 46E. A fluid filter 50, a hydraulic fluid cooler 52, and a hydraulic fluid storage tank 54 are disposed serially with respect to the second return conduit. A bypass conduit 56 is arranged to enable returned fluid to bypass storage tank 54. Hydraulic fluid cooler 52 comprises a heat exchanger (not separately shown) disposed to dissipate heat to ambient air, an electrically operated fan 53 disposed to force ambient air through the heat exchanger, and a thermostat 51 which operates the fan when fluid contained within cooler 52 exceed a predetermined temperature.

Figure 3:
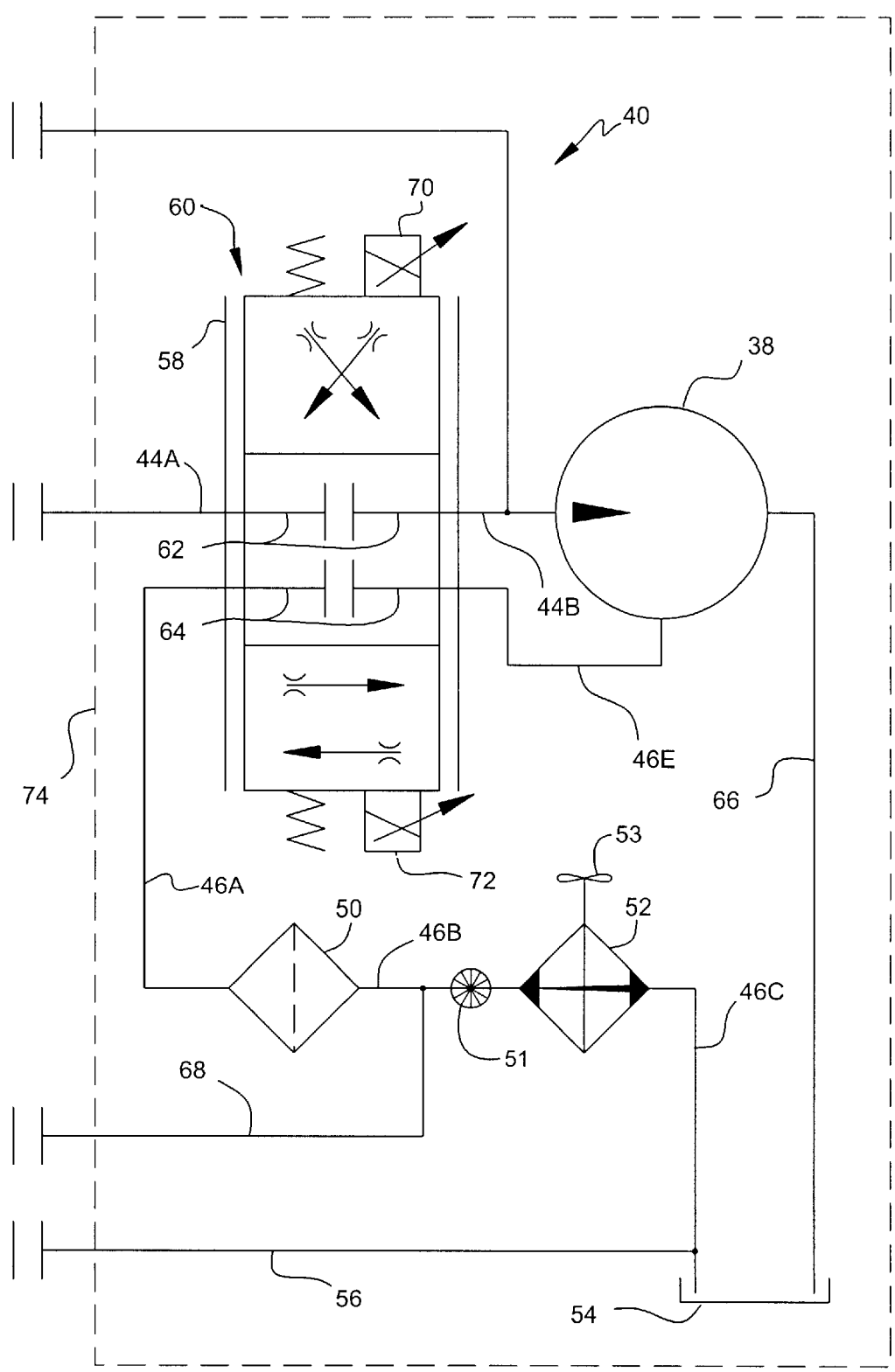
FIG. 3 is a diagrammatic detail view of part of the hydraulic circuit of FIG. 2, showing details of the proportional control valve assembly.

Proportional control valve assembly 40 is disposed serially with respect to the supply conduit and is interposed between the outlet of pump 36 and the inlet of motor 38. Control valve assembly 40 is controlled by an automatic control circuit shown in FIG. 4 which will be described hereinafter. As seen in FIG. 3, valve assembly 40 includes a housing 58 enclosing a valve chamber 60, a first fluid passage 62 and a second fluid passage 64, wherein fluid passages 62, 64 are disposed in fluid communication with chamber 60. Passage 62 is disposed serially with respect to supply conduit sections 44A, 44B. Passage 64 is connected in fluid communication with the return conduit comprising sections 46A, 46E. A bleed conduit 66 discharges a minor quantity of fluid from motor 38 directly to tank 54. A drain line 68 is provided for draining fluid from the hydraulic circuit for maintenance and repairs.

Valve assembly 40 is seen to be a closed center electrohydraulic servo control valve assembly incorporating a spool valve which shuttles reciprocatingly within housing 58 such that flow in passages 62 and 64 can proceed in a first direction, in an opposite direction, or is entirely obstructed when the spool valve is in the center position. The valve is so configured that flow rate in both directions is progressively metered or varied. Solenoids 70, 72 move the spool valve responsively to signals generated by the automatic control circuit shown in FIG. 4. It is an important feature of the invention that passages 62 and 64 are dimensioned and configured such that each passage 62 or 64 is of the minimum cross sectional surface area occurring within their respective supply conduit sections 46A . . . 46E and return conduit sections 44A, 44B.

Apart from hydraulic pump 36 and fluid conduits connected to pump 36, most of the hydraulic components are mounted within a housing 74. This enables the hydraulic components to be readily installed as a unit within vehicle 10. As best seen in FIG. 1, installation of the hydraulic components requires only that pump 36 be connected to power take-off 32, housing 74 be suitably mounted to chassis 12, and fluid connections be made between pump 36 and components contained within housing 74.

The control circuit is shown in FIG. 4. The control circuit controls valve assembly 40 such that valve assembly 40 selectively controls fluid flow within passages 62, 64 by generating signals which operate solenoids 70, 72. Signals are generated by the following method. A tab 75 is affixed to shaft 42 of hydraulic motor 38. A sensor 76 senses rotational speed of motor 38 and shaft 42 by detecting passage of tab 75 past sensor 76 at each revolution of shaft 42, and responsively sends a signal to a microprocessor or data processor or central processing unit 78. Sensor 76 is preferably an eddy current sensor mounted in a fixed position proximate shaft 42. A preferred arrangement is shown in more detail in U.S. Pat. No. 5,908,183, which patent is hereby incorporated by reference.

Central processing unit 78 is operably connected to a reference signal generator disposed to generate a reference signal indicative of a desired predetermined rate of rotation of generator 34. The reference signal generator is preferably digital variable pulse generator 80. An algebraic comparing subcircuit 82 is disposed to compare sensed rotational speed of hydraulic motor 38 with the reference signal. Comparing subcircuit 82 generates a control signal controlling solenoids 70, 72, and hence the spool valve of control valve assembly 40 in a manner assuring that rate of fluid conducted to supply conduit sections 44A, 44B be constant independently of any changes in the rate of fluid discharged by hydraulic pump 36.

Certain annunciation and control elements of the control circuit are provided in a location on vehicle 10 enabling ready access to operating personnel. These elements include a digital display 84 operably connected to the control circuit. Digital display 84 displays real time values of generator output voltage, generator output frequency, generator output amperage, generator rotational speed, and elapsed time of generator operation. Central processing unit 78 serves in part as a voltage regulator disposed to adjust voltage output of generator 34 to a predetermined voltage. If a voltage value displayed on digital display 84 is not satisfactory, then adjustments may be entered by a keypad 8G operably associated with a non-volatile memory 88 and operably connected to central processing unit 78. A remote "on-off" or "start-stop" switch 90 is also operably connected to central processing unit 78 to operate and cease operation of generator 34.

Another feature of the control circuit is a "soft start" or ramping subcircuit 92, which modifies the control signal to solenoids 70, 72 such that when started from a stopped condition, generator 34 accelerates gradually and smoothly up to the selected rotational speed. The period of time of acceleration to full operating speed is preferably adjustable within a range of ten seconds to one minute. The period for acceleration can be adjusted by commands entered by keypad 86. Gradual acceleration of generator 34 is a protective feature which eliminates severe stresses which would otherwise be imposed on the hydraulic circuit in the event of unduly abrupt or harsh acceleration.

Another protective feature is that of a circuit breaker 94 which is located in series with output conductors 96 connected to the output terminals (not separately shown) of generator 34. Output conductors will be understood to include all necessary conductors, such as neutral and ground as well as live phase conductors. Circuit breaker 94 operates conventionally by opening an external circuit (not shown) which is connected to conductors 96 to conduct electrical power to powered equipment.

The present invention is susceptible to variations and modifications which may be introduced thereto without departing from the inventive concept. For example, the valve four-way valve assembly depicted herein could alternatively be a single throttled proportional valve. Additional examples include but are not limited to the following. Control of the proportional valve may utilize generator output frequency as an input. Where generator capacity is relatively great, such as seven and one half kilowatts and greater, both frequency and shaft speed sensing are used to control a four way proportional valve. The shaft speed control signal is connected to one side of the coil of the solenoid valve, and a signal derived from the generator output frequency is connected to the other side of the coil. This procedure is preferred to properly control relatively great volumes and pressures of hydraulic fluid. Control of a single or four-way valve can use frequency sensing or shaft speed sensing, or a combination of both, depending upon the application.

The power train components (i.e., engine 14, transmission 16, driveshaft 26, differential gear assembly 28, and rear axle 30) may be arranged differently from the depiction of FIG. 1. Illustratively, the engine may be located at any one of diverse locations with respect to chassis 12. A transaxle (not shown) may be utilized if desired. More or fewer than two wheels may be powered. A hydraulic power transmission scheme may be substituted for the mechanical transmission components described herein. The motor vehicle may be a boat driven by a propeller or by a water pump arrangement, or an aircraft. It is merely necessary for the purposes of the present invention that the associated motor vehicle have an engine and be self-propelled.

It is to be understood that the present invention is not limited to the embodiments described above, but encompasses any and all embodiments within the scope of the following claims.

I claim:

1. Apparatus for driving a generator carried aboard a motor vehicle having an engine and a power take-off at a constant speed despite fluctuations in rotational speed of the engine, comprising:

a hydraulic pump connectable to the power take-off to be driven thereby, having an inlet disposed to receive fluid for pumping and an outlet for discharging pumped fluid under pressure;

a hydraulic motor drivably connectable to the generator, having an inlet disposed to receive fluid under pressure and an outlet disposed to discharge spent fluid;

a fluid circuit comprising a supply conduit disposed to conduct fluid discharged by said pump to said motor, a return conduit disposed to return fluid discharged by said motor to said pump, and a recirculating conduit disposed to return fluid discharged by said pump to said inlet of said pump;

a proportional control valve assembly disposed serially with respect to said supply conduit and interposed between said outlet of said pump and said inlet of said motor, said control valve assembly having a housing having a valve chamber, a valve disposed within said valve chamber, a solenoid disposed to move said valve within said valve chamber, a first fluid passage disposed in fluid communication with said valve chamber, a second fluid passage disposed in communication with said valve chamber, wherein said valve selectively closes and opens said first fluid passage and said second fluid passage, wherein said first fluid passage of said valve assembly is disposed within said supply conduit and said second fluid passage of said valve assembly is connected in fluid communication with said return conduit, and wherein said first fluid passage is dimensioned and configured such that said first fluid passage is of the minimum cross sectional surface area occurring within said supply conduit, and said second fluid passage is dimensioned and configured such that said second fluid passage is dimensioned and configured such that said second fluid passage is of the minimum cross sectional surface area occurring within said return conduit; and a control circuit disposed to control said valve assembly such that said valve assembly controls fluid flow within said first fluid outlet of said valve assembly and said second fluid outlet of said valve assembly, wherein said control circuit includes
- a sensor disposed to sense rotational speed of said motor,
- a reference signal generator disposed to generate a reference signal indicative of a predetermined rate of rotation, and
- a comparing subcircuit disposed to compare sensed rotational speed of said motor with said reference signal, and to generate a control signal controlling said valve assembly in a manner assuring that rate of fluid conducted to said supply conduit be constant independently of rate of fluid discharged by said pump.

2. The apparatus according to claim 1, wherein said control valve assembly is an electrohydraulic servo control valve assembly.

3. The apparatus according to claim 1, wherein said reference signal generator is a digital variable pulse generator.

4. The apparatus according to claim 1, further including a digital display connected to said control circuit, wherein said digital display is disposed to display real time values of generator output voltage, generator output frequency, generator output amperage, generator rotational speed, and elapsed time of generator operation.

5. The apparatus according to claim 1, wherein said fluid circuit includes a fluid storage tank disposed serially with respect to said return conduit.

6. The apparatus according to claim 5, wherein said fluid circuit further includes a hydraulic fluid filter disposed serially with respect to said return conduit.

7. The apparatus according to claim 5, wherein said fluid circuit further includes a hydraulic fluid cooler disposed serially with respect to said return conduit, an electrically operated fan disposed to pass ambient air through said hydraulic fluid cooler, and a thermostat disposed to operate said fan when fluid contained within said hydraulic fluid cooler attains temperatures exceeding a predetermined temperature.

8. The apparatus according to claim 7, wherein said fluid circuit further includes a hydraulic fluid filter disposed serially with respect to said return conduit, and a housing enclosing said hydraulic motor, said control valve assembly, said fluid filter, said fluid cooler, and said fluid storage tank, whereby said hydraulic motor, said control valve assembly, said fluid filter, said fluid cooler, and said fluid storage tank are readily installed as a unit on the chassis of the motor vehicle.

9. The apparatus according to claim 1, wherein said generator has output conductors and a circuit breaker disposed to open a circuit connected to said output conductors.

10. The apparatus according to claim 1, further comprising a voltage regulator disposed to adjust voltage output of said generator to a predetermined voltage.

11. The apparatus according to claim 1, wherein said hydraulic motor has a rotatable shaft, and said sensor includes a projection ixed to said rotatable shaft of said hydraulic motor and an eddy current sensor mounted in a fixed position relative to and proximate said projection and said rotatable shaft.

12. The apparatus according to claim 1, wherein said sensor is responsive to generator output frequency.

13. The apparatus according to claim 1, wherein said control circuit has a ramping subcircuit disposed to modify said control signal of said comparing subcircuit controlling said control valve assembly such that acceleration of said generator is accomplished in a time period of at least ten seconds.

14. The apparatus according to claim 13, wherein said ramping subcircuit is adjustable such that the time period of acceleration of said generator is adjustable within a range of ten seconds to one minute.

15. Apparatus for driving a generator carried aboard a motor vehicle having an engine and a power take-off at a constant speed despite fluctuations in rotational speed of the engine, comprising:

a hydraulic pump connectable to the power take-off to be driven thereby, having an inlet disposed to receive fluid for pumping and an outlet for discharging pumped fluid under pressure, a hydraulic motor drivably connectable to the generator, having an inlet disposed to receive fluid under pressure and an outlet disposed to discharge spent fluid;

a fluid circuit comprising a supply conduit disposed to conduct fluid discharged by said pump to said motor, a return conduit disposed to return fluid discharged by said motor to said pump, a recirculating conduit disposed to return fluid discharged by said pump to said inlet of said pump, a fluid storage tank disposed serially with respect to said return conduit, a hydraulic fluid filter disposed serially with respect to said return conduit, a hydraulic fluid cooler disposed serially with respect to said return conduit, an electrically operated fan disposed to pass ambient air through said hydraulic fluid cooler, and a thermostat disposed to operate said fan when fluid contained within said hydraulic fluid cooler attains temperatures exceeding a predetermined temperature, and a hydraulic fluid filter disposed serially with respect to said return conduit, and a housing enclosing said hydraulic motor, said control valve assembly, said fluid filter, said fluid cooler, and said fluid storage tank, whereby said hydraulic motor, said control valve assembly, said fluid filter, said fluid cooler, and said fluid storage tank are readily installed as a unit on the chassis of the motor vehicle;

an electrohydraulic, closed center, proportional servo control valve assembly disposed serially with respect to said supply conduit and interposed between said outlet of said pump and said inlet of said motor, said control valve assembly having a housing having a valve chamber, a valve disposed within said valve chamber, a solenoid disposed to move said valve within said valve chamber, a first fluid passage disposed in fluid communication with said valve chamber, a second fluid passage disposed in communication with said valve chamber, wherein said valve selectively closes and opens said first fluid passage and said second fluid passage, wherein said first fluid passage of said valve assembly is disposed within said supply conduit and said second fluid passage of said valve assembly is connected in fluid communication with said return conduit, and wherein said first fluid passage is dimensioned and configured such that said first fluid passage is of the minimum cross sectional surface area occurring within said supply conduit, and said second fluid passage is dimensioned and configured such that said second fluid passage is dimensioned and configured such that said second fluid passage is of the minimum cross sectional surface area occurring within said return conduit; and a control circuit disposed to control said valve assembly such that said valve assembly controls fluid flow within said first fluid outlet of said valve assembly and said second fluid outlet of said valve assembly, wherein said control circuit includes a sensor disposed to sense rotational speed of said motor, wherein said hydraulic motor has a rotatable shaft, and said sensor includes a projection fixed to said rotatable shaft of said hydraulic motor and an eddy current sensor mounted in a fixed position proximate said rotatable shaft and said projection, a reference signal generator disposed to generate a reference signal indicative of a predetermined rate of rotation, wherein said reference signal generator is a digital variable pulse generator, a comparing subcircuit disposed to compare sensed rotational speed of said motor with said reference signal, and to generate a control signal controlling said valve assembly in a manner assuring that rate of fluid conducted to said supply conduit be constant independently of rate of fluid discharged by said pump, a digital display connected to said control circuit, wherein said digital display is disposed to display real time values of generator output voltage, generator output frequency, generator output amperage, generator rotational speed, and elapsed time of generator operation, a ramping subcircuit disposed to modify said control signal of said comparing subcircuit controlling said control valve assembly such that acceleration of said generator is accomplished in a time period adjustable within a range of ten seconds to one minute, and a voltage regulator disposed to adjust voltage output of said generator to a predetermined voltage, wherein said generator has output conductors and a circuit breaker disposed to open a circuit connected to said output conductors.

16. Apparatus for driving a generator carried aboard a motor vehicle having an engine and a power take-off at a constant speed despite fluctuations in rotational speed of the engine, comprising:

a hydraulic pump connectable to the power take-off to be driven thereby, having an inlet disposed to receive fluid for pumping and an outlet for discharging pumped fluid under pressure;

a hydraulic motor drivably connectable to the generator, having an inlet disposed to receive fluid under pressure and an outlet disposed to discharge spent fluid;

a fluid circuit comprising a supply conduit disposed to conduct fluid discharged by said pump to said motor, a return conduit disposed to return fluid discharged by said motor to said pump, a recirculating conduit disposed to return fluid discharged by said pump to said inlet of said pump, a fluid storage tank disposed serially with respect to said return conduit, a hydraulic fluid filter disposed serially with respect to said return conduit, a hydraulic fluid cooler disposed serially with respect to said return conduit, an electrically operated fan disposed to pass ambient air through said hydraulic fluid cooler, and a thermostat disposed to operate said fan when fluid contained within said hydraulic fluid cooler attains temperatures exceeding a predetermined temperature, and a hydraulic fluid filter disposed serially with respect to said return conduit, and a housing enclosing said hydraulic motor, said control valve assembly, said fluid filter, said fluid cooler, and said fluid storage tank, whereby said hydraulic motor, said control valve assembly, said fluid filter, said fluid cooler, and said fluid storage tank are readily installed as a unit on the chassis of the motor vehicle;

an electrohydraulic, closed center, proportional servo control valve assembly disposed serially with respect to said supply conduit and interposed between said outlet of said pump and said inlet of said motor, said control valve assembly having a housing having a valve chamber, a valve disposed within said valve chamber, a solenoid disposed to move said valve within said valve chamber, a first fluid passage disposed in fluid communication with said valve chamber, a second fluid passage disposed in communication with said valve chamber, wherein said valve selectively closes and opens said first fluid passage and said second fluid passage, wherein said first fluid passage of said valve assembly is disposed within said supply conduit and said second fluid passage of said valve assembly is connected in fluid communication with said return conduit, and wherein said first fluid passage is dimensioned and configured such that said first fluid passage is of the minimum cross sectional surface area occurring within said supply conduit, and said second fluid passage is dimensioned and configured such that said second fluid passage is dimensioned and configured such that said second fluid passage is of the minimum cross sectional surface area occurring within said return conduit; and a control circuit disposed to control said valve assembly such that said valve assembly controls fluid flow within said first fluid outlet of said valve assembly and said second fluid outlet of said valve assembly, wherein said control circuit includes a sensor disposed to sense generator output frequency, a reference signal generator disposed to generate a reference signal indicative of a predetermined rate of rotation, wherein said reference signal generator is a digital variable pulse generator, a comparing subcircuit disposed to compare sensed output frequency of said generator with said reference signal, and to generate a control signal controlling said valve assembly in a manner assuring that rate of fluid conducted to said supply conduit be constant independently of rate of fluid discharged by said pump, a digital display connected to said control circuit, wherein said digital display is disposed to display real time values of generator output voltage, generator output frequency, generator output amperage, generator rotational speed, and elapsed time of generator operation, a ramping subcircuit disposed to modify said control signal of said comparing subcircuit controlling said control valve assembly such that acceleration of said generator is accomplished in a time period adjustable within a range of ten seconds to one minute, and a voltage regulator disposed to adjust voltage output of said generator to a predetermined voltage, wherein said generator has output conductors and a circuit breaker disposed to open a circuit connected to said output conductors.

17. A motor vehicle having an engine and an onboard AC generator driven by said engine, wherein said AC generator is controlled to operate at a selected constat rotational speed independently of fluctuations in rotational speeds of said engine, comprising:

a chassis and a plurality of road wheels suspended from said chassis, a power train drivably connected to said road wheels, wherein said power train includes an engine, a transmission having a rotatable shaft driven by said engine, and a power take-off driven by said rotatable shaft of said transmission;

a generator supported on said chassis; and apparatus for driving said generator, comprising a hydraulic pump connectable to the power take-off to be driven thereby, having an inlet disposed to receive fluid for pumping and an outlet for discharging pumped fluid under pressure;

a hydraulic motor drivably connectable to the generator, having an inlet disposed to receive fluid under pressure and an outlet disposed to discharge spent fluid;

a fluid circuit comprising a supply conduit disposed to conduct fluid discharged by said pump to said motor, a return conduit disposed to return fluid discharged by said motor to said pump, a recirculating conduit disposed to return fluid discharged by said pump to said inlet of said pump, a fluid storage tank disposed serially with respect to said return conduit, a hydraulic fluid filter disposed serially with respect to said return conduit, a hydraulic fluid cooler disposed serially with respect to said return conduit, an electrically operated fan disposed to pass ambient air through said hydraulic fluid cooler, and a thermostat disposed to operate said fan when fluid contained within said hydraulic fluid cooler attains temperatures exceeding a predetermined temperature, and a hydraulic fluid filter disposed serially with respect to said return conduit, and a housing enclosing said hydraulic motor, said control valve assembly, said fluid filter, said fluid cooler, and said fluid storage tank, whereby said hydraulic motor, said control valve assembly, said fluid filter, said fluid cooler, and said fluid storage tank are readily installed as a unit on the chassis of the motor vehicle;

an electrohydraulic, closed center, proportional servo control valve assembly disposed serially with respect to said supply conduit and interposed between said outlet of said pump and said inlet of said motor, said control valve assembly having a housing having a valve chamber, a valve disposed within said valve chamber, a solenoid disposed to move said valve within said valve chamber, a first fluid passage disposed in fluid communication with said valve chamber, a second fluid passage disposed in communication with said valve chamber, wherein said valve selectively closes and opens said first fluid passage and said second fluid passage, wherein said first fluid passage of said valve assembly is disposed within said supply conduit and said second fluid passage of said valve assembly is connected in fluid communication with said return conduit, and wherein said first fluid passage is dimensioned and configured such that said first fluid passage is of the minimum cross sectional surface area occurring within said supply conduit, and said second fluid passage is dimensioned and configured such that said second fluid passage is dimensioned and configured such that said second fluid passage is of the minimum cross sectional surface area occurring within said return conduit; and a control circuit disposed to control said valve assembly such that said valve assembly controls fluid flow within said first fluid passage of said valve assembly and said second fluid passage of said valve assembly, wherein said control circuit includes a sensor disposed to sense rotational speed of said motor, wherein said hydraulic pump has a rotatable shaft, and said sensor includes a projection fixed to said rotatable shaft of said hydraulic pump and an eddy current sensor mounted in a fixed position proximate said rotatable shaft and said projection, a reference signal generator disposed to generate a reference signal indicative of a predetermined rate of rotation, wherein said reference signal generator is a digital variable pulse generator, a comparing subcircuit disposed to compare sensed rotational speed of said motor with said reference signal, and to generate a control signal controlling said valve assembly in a manner assuring that rate of fluid conducted to said supply conduit be constant independently of rate of fluid discharged by said pump, a digital display connected to said control circuit, wherein said digital display is disposed to display real time values of generator output voltage, generator output, frequency, generator output amperage, generator rotational speed, and elapsed time of generator operation, a ramping subcircuit disposed to modify said control signal of said comparing subcircuit controlling said control valve assembly such that acceleration of said generator is accomplished in a time period adjustable within a range of ten seconds to one minute, and a voltage regulator disposed to adjust voltage output of said generator to a predetermined voltage, and wherein said generator has output conductors and a circuit breaker disposed to open a circuit connected to said output conductors.

18. A motor vehicle having an engine and an onboard AC generator driven by said engine, wherein said AC generator is controlled to operate at a selected constat rotational speed independently of fluctuations in rotational speeds of said engine, comprising:

a chassis and a plurality of road wheels suspended from said chassis, a power train drivably connected to said road wheels, wherein said power train includes an engine, a transmission having a rotatable shaft driven by said engine, and a power take-off driven by said rotatable shaft of said transmission;

a generator supported on said chassis; and apparatus for driving said generator, comprising a hydraulic pump connectable to the power take-off to be driven thereby, having an inlet disposed to receive fluid for pumping and an outlet for discharging pumped fluid under pressure;

a hydraulic motor drivably connectable to the generator, having an inlet disposed to receive fluid under pressure and an outlet disposed to discharge spent fluid;

a fluid circuit comprising a supply conduit disposed to conduct fluid discharged by said pump to said motor, a return conduit disposed to return fluid discharged by said motor to said pump, a recirculating conduit disposed to return fluid discharged by said pump to said inlet of said pump, a fluid storage tank disposed serially with respect to said return conduit, a hydraulic fluid filter disposed serially with respect to said return conduit, a hydraulic fluid cooler disposed serially with respect to said return conduit, an electrically operated fan disposed to pass ambient air through said hydraulic fluid cooler, and a thermostat disposed to operate said fan when fluid contained within said hydraulic fluid cooler attains temperatures exceeding a predetermined temperature, and a hydraulic fluid filter disposed serially with respect to said return conduit, and a housing enclosing said hydraulic motor, said control valve assembly, said fluid filter, said fluid cooler, and said fluid storage tank, whereby said hydraulic motor, said control valve assembly, said fluid filter, said fluid cooler, and said fluid storage tank are readily installed as a unit on the chassis of the motor vehicle;

an electrohydraulic, closed center, proportional servo control valve assembly disposed serially with respect to said supply conduit and interposed between said outlet of said pump and said inlet of said motor, said control valve assembly having a housing having a valve chamber, a valve disposed within said valve chamber, a solenoid disposed to move said valve within said valve chamber, a first fluid passage disposed in fluid communication with said valve chamber, a second fluid passage disposed in communication with said valve chamber, wherein said valve selectively closes and opens said first fluid passage and said second fluid passage, wherein said first fluid passage of said valve assembly is disposed within said supply conduit and said second fluid passage of said valve assembly is connected in fluid communication with said return conduit, and wherein said first fluid passage is dimensioned and configured such that said first fluid passage is of the minimum cross sectional surface area occurring within said supply conduit, and said second fluid passage is dimensioned and configured such that said second fluid passage is dimensioned and configured such that said second fluid passage is of the minimum cross sectional surface area occurring within said return conduit; and a control circuit disposed to control said valve assembly such that said valve assembly controls fluid flow within said first fluid passage of said valve assembly and said second fluid passage of said valve assembly, wherein said control circuit includes a sensor disposed to sense output frequency of said generator, a reference signal generator disposed to generate a reference signal indicative of a predetermined rate of rotation, wherein said reference signal generator is a digital variable pulse generator, a comparing subcircuit disposed to compare sensed output frequency of said generator with said reference signal, and to generate a control signal controlling said valve assembly in a manner assuring that rate of fluid conducted to said supply conduit be constant independently of rate of fluid discharged by said pump, a digital display connected to said control circuit, wherein said digital display is disposed to display real time values of generator output voltage, generator output frequency, generator output amperage, generator rotational speed, and elapsed time of generator operation, a ramping subcircuit disposed to modify said control signal of said comparing subcircuit controlling said control valve assembly such that acceleration of said generator is accomplished in a time period adjustable within a range of ten seconds to one minute, and a voltage regulator disposed to adjust voltage output of said generator to a predetermined voltage, and wherein said generator has output conductors and a circuit breaker disposed to open a circuit connected to said output conductors.

* * * * *